United States Patent
Moorcroft et al.

(10) Patent No.: US 11,719,210 B2
(45) Date of Patent: Aug. 8, 2023

(54) CONTROLLER AND METHOD FOR OPERATING STARTER MOTOR

(71) Applicant: JAGUAR LAND ROVER LIMITED, Warwickshire (GB)

(72) Inventors: Adam Moorcroft, Coventry (GB); Stephen Stacey, Coventry (GB); Ian Cooper, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 0 days.

(21) Appl. No.: 17/416,171

(22) PCT Filed: Dec. 10, 2019

(86) PCT No.: PCT/EP2019/084500
§ 371 (c)(1),
(2) Date: Jun. 18, 2021

(87) PCT Pub. No.: WO2020/126698
PCT Pub. Date: Jun. 25, 2020

(65) Prior Publication Data
US 2022/0049676 A1   Feb. 17, 2022

(30) Foreign Application Priority Data

Dec. 21, 2018 (GB) .................................. 1820974

(51) Int. Cl.
*F02N 11/08* (2006.01)
*F02D 41/06* (2006.01)
*F02N 19/00* (2010.01)

(52) U.S. Cl.
CPC ........ *F02N 11/0848* (2013.01); *F02D 41/061* (2013.01); *F02N 11/0803* (2013.01);
(Continued)

(58) Field of Classification Search
CPC ............. F02N 11/0803; F02N 11/0844; F02N 2200/022; F02N 11/0855; F02D 41/042
(Continued)

(56) References Cited

U.S. PATENT DOCUMENTS 6,702,718 B2 * 3/2004 Tani .................. B60W 10/18
477/203
6,802,291 B2 * 10/2004 Ujifusa ............... F02N 11/0818
123/179.4
(Continued)

FOREIGN PATENT DOCUMENTS

DE   102011102544 A1   12/2011
EP       2280162 A1    2/2011
(Continued)

OTHER PUBLICATIONS

Combined Search and Examination Report under Sections 17 and 18(3) for Application No. GB1820974.2 dated Jun. 19, 2019.
(Continued)

*Primary Examiner* — John Kwon
*Assistant Examiner* — Arnold Castro
(74) *Attorney, Agent, or Firm* — Carlson, Gaskey & Olds, P.C.

(57) ABSTRACT

Embodiments of the present invention provide a controller for a starter motor operable to receive a first input indicative of an engine shutdown being required, a second input indicative of a change-of-mind event having occurred after initiation of engine shutdown and a third input indicative of the engine position. After receipt of the first input the controller is operable to monitor the third input and to determine an expected engine rotation direction indicative of the expected rotation direction of the engine after a predetermined delay. If the expected engine rotation direction is positive and the second input is received then the controller (Continued)

is configured to control the output means to cause the starter motor of the engine to be actuated upon receipt of the second input. If the expected engine rotation direction is negative and the second input is received then the controller is configured to delay controlling the output means to cause the starter motor of the engine to be actuated until a determination is made that the expected rotation direction is positive. Advantageously, the controller calculates the expected engine rotation direction before receipt of the input indicative of the change-of-mind event having occurred, thereby reducing the time required to determine whether or not the starter motor can be actuated.

12 Claims, 6 Drawing Sheets

(52) U.S. Cl.
CPC ...... *F02N 11/0844* (2013.01); *F02N 11/0855* (2013.01); *F02N 19/005* (2013.01); *F02N 2019/007* (2013.01)

(58) Field of Classification Search
USPC .............................. 123/179.4; 701/113, 114
See application file for complete search history.

(56) References Cited

U.S. PATENT DOCUMENTS

| | | | | |
|---|---|---|---|---|
| 6,807,934 B2* | 10/2004 | Kataoka | F02N 11/0814 | 123/179.4 |
| 6,834,632 B2* | 12/2004 | Kataoka | F02N 99/006 | 123/179.4 |
| 6,839,621 B2* | 1/2005 | Kaneko | F02D 41/042 | 701/112 |
| 7,150,254 B2* | 12/2006 | Ichimoto | B60K 6/445 | 123/179.4 |
| 7,204,222 B2* | 4/2007 | Yamauchi | F02N 11/0818 | 123/179.4 |
| 7,210,443 B2* | 5/2007 | Shimokawa | F02N 11/0822 | 123/179.4 |
| 7,263,959 B2* | 9/2007 | Kataoka | F02D 41/126 | 123/179.4 |
| 7,377,248 B2* | 5/2008 | Hokuto | F02D 41/3094 | 123/179.4 |
| 7,436,186 B2* | 10/2008 | Boettcher | F02D 41/009 | 123/406.61 |
| 7,481,194 B2* | 1/2009 | Celisse | F02N 11/0818 | 123/179.4 |
| 8,265,860 B2* | 9/2012 | Ichinose | F02D 17/04 | 701/113 |
| 8,302,575 B2* | 11/2012 | Senda | F02N 11/0833 | 123/179.4 |
| 8,355,860 B2* | 1/2013 | Liu | F02N 11/0855 | 701/113 |
| 8,504,279 B2* | 8/2013 | Ishikawa | F02N 11/0844 | 701/112 |
| 8,676,478 B2* | 3/2014 | Nakai | B60W 10/06 | 701/112 |
| 9,140,201 B2* | 9/2015 | Kato | F02N 19/005 | |
| 9,222,453 B2* | 12/2015 | Gibson | F02D 41/065 | |
| 9,689,332 B2* | 6/2017 | Rai | F02D 41/065 | |
| 2002/0033157 A1* | 3/2002 | Thompson | F02D 17/04 | 123/179.4 |
| 2003/0041830 A1* | 3/2003 | Sugiura | F02D 41/065 | 123/179.4 |
| 2004/0149245 A1* | 8/2004 | Moriya | F02N 11/0833 | 123/179.4 |
| 2004/0221828 A1* | 11/2004 | Ries-Mueller | F02N 11/10 | 123/179.3 |
| 2005/0228575 A1* | 10/2005 | Murakami | F02D 41/065 | 701/112 |
| 2007/0068476 A1* | 3/2007 | Asada | F02N 15/022 | 123/179.24 |
| 2007/0084429 A1* | 4/2007 | Taki | F02N 11/0844 | 123/179.4 |
| 2007/0137602 A1* | 6/2007 | Kassner | F02N 11/0844 | 123/179.25 |
| 2008/0262707 A1* | 10/2008 | Yamaguchi | F02N 11/0844 | 701/112 |
| 2009/0037085 A1* | 2/2009 | Kojima | F02N 99/006 | 701/113 |
| 2009/0224557 A1* | 9/2009 | Reynolds | F02N 15/023 | 290/38 R |
| 2010/0050970 A1* | 3/2010 | Okumoto | F02N 11/0844 | 123/179.4 |
| 2010/0059007 A1* | 3/2010 | Senda | F02N 11/0844 | 123/179.4 |
| 2010/0174473 A1* | 7/2010 | Pursifull | F02N 11/00 | 701/112 |
| 2010/0180849 A1* | 7/2010 | Senda | F02N 11/0855 | 123/179.4 |
| 2010/0305820 A1* | 12/2010 | McGee | B60W 10/06 | 701/54 |
| 2011/0137544 A1* | 6/2011 | Kawazu | F02N 15/06 | 701/113 |
| 2011/0172900 A1* | 7/2011 | Mukaihara | F02N 11/0855 | 701/112 |
| 2012/0024253 A1* | 2/2012 | Hartmann | F02N 11/0855 | 123/179.25 |
| 2012/0029797 A1* | 2/2012 | Notani | F02N 11/0844 | 701/113 |
| 2012/0103294 A1* | 5/2012 | Kitano | F02N 11/0814 | 123/179.25 |
| 2012/0208674 A1* | 8/2012 | Doering | F02D 41/042 | 477/107 |
| 2013/0005532 A1* | 1/2013 | Gibson | F16H 61/16 | 477/115 |
| 2013/0006499 A1* | 1/2013 | Date | F02D 41/042 | 701/104 |
| 2013/0179054 A1* | 7/2013 | Calva | F02N 99/006 | 701/113 |
| 2013/0268181 A1* | 10/2013 | Nagasawa | F02N 11/0814 | 701/112 |
| 2013/0289855 A1* | 10/2013 | Kitano | F02N 11/0855 | 701/113 |
| 2014/0096642 A1* | 4/2014 | Gray | F02N 11/0855 | 74/7 C |
| 2014/0336909 A1* | 11/2014 | Doit | F02N 11/0855 | 701/113 |
| 2014/0350829 A1* | 11/2014 | Tumback | F02N 11/0855 | 701/113 |
| 2015/0066338 A1* | 3/2015 | Howell | F02N 11/0844 | 701/112 |
| 2015/0211465 A1* | 7/2015 | Bradfield | F02N 11/0855 | 123/179.3 |
| 2017/0254310 A1* | 9/2017 | Nakaoka | F02N 11/101 | |
| 2018/0209355 A1* | 7/2018 | Nakane | F02D 41/062 | |
| 2019/0055911 A1* | 2/2019 | Hesketh | F02D 41/042 | |
| 2019/0061732 A1* | 2/2019 | Petridis | F02N 11/0822 | |
| 2019/0301389 A1* | 10/2019 | Joseph | F02D 41/2403 | |

FOREIGN PATENT DOCUMENTS

| | | |
|---|---|---|
| GB | 2517752 A | 3/2015 |
| JP | 2013047466 A | 3/2013 |
| WO | 2018180650 A1 | 10/2018 |

OTHER PUBLICATIONS

International Search Report and Written Opinion of the International Searching Authority for International application Mo. PCT/EP2019/084500 dated Apr. 2, 2020.

* cited by examiner

CONTROLLER AND METHOD FOR OPERATING STARTER MOTOR

TECHNICAL FIELD

The present disclosure relates to a controller and method for operating starter motor Aspects of the invention relate to a controller, to a stop-start system, to a method, and to a vehicle.

BACKGROUND

It is known to provide vehicles having an internal combustion engine with "stop-start" functionality that can perform an "eco-stop" by turning the engine off when motive power is not required from the engine. Such an eco-stop is typically performed when a determination is made that the vehicle is being held stationary by a braking means such as a footbrake or a handbrake, but it also may be performed in hybrid vehicles when the vehicle transitions into an electric vehicle mode in which motive power is provided solely by an electric machine. Eco-stops may also be performed when the vehicle is still moving but is expected to come to rest in the near future. The engine is subsequently restarted when a determination is made that motive power from the engine will soon be required, which may occur when a driver begins to release the braking means or when a driver torque request exceeds that which can be provided by the electric machine alone.

In a vehicle having a stop-start system, it may be determined that motive power will imminently be required from the engine soon after the system has initiated a shutdown of the engine. This may occur when a driver of the vehicle initially requests a braking force, for example by depressing a footbrake, and the conditions required for an eco-stop to be performed are met, and subsequently demands a positive torque from the engine, for example by depressing an accelerator pedal of the vehicle, shortly after the system has initiated a shutdown of the engine. Such a scenario may be referred to as a "change-of-mind" event. In such an event, it may be necessary to wait until the shutdown of the engine is completed before re-starting the engine. This may result in inconvenience to a user of the vehicle, as it may delay the availability of motive power from the engine.

It is an object of the invention to at least mitigate one or more of the problems of the prior art.

SUMMARY OF THE INVENTION

Aspects and embodiments of the invention provide a controller, a stop-start system, a method, and a vehicle as claimed in the appended claims.

According to an aspect of the invention for which protection is sought there is provided a controller for a starter motor and an engine, comprising:
input means configured to receive a first signal, indicative of shutdown of the engine being required, a second signal, indicative of restart of the engine being required after initiation of shutdown of the engine, and a third signal, indicative of a position of the engine;
output means; and
processing means arranged to communicate with the input means and the output means,
wherein:
the processing means is arranged to monitor the third signal and determine an expected engine rotation direction after a predetermined delay in dependence on the third signal;
the controller is configured to control the output means to cause the starter motor to be actuated upon receipt of the second signal if the expected engine rotation direction is positive and the second signal is received; and
the controller is configured to delay controlling the output means to cause the starter motor to be actuated until a determination is made that the expected rotation direction is positive if the expected engine rotation direction is negative and the second signal is received. Advantageously, the controller calculates the expected engine rotation direction before receipt of the input indicative of an engine restart being required, thereby reducing the time required to determine whether or not the starter motor can be actuated. The input indicative of an engine restart being required may be an input indicative of a change-of-mind event having occurred.

It will be understood that the expected engine rotation direction may be clockwise or counter clockwise. However, the rotation direction will typically be referred to as either "positive" or "negative", with positive rotation corresponding to rotation in the direction that the engine rotates in during normal running (this will typically be the direction that results in forward motion of a vehicle that the engine is installed in when a forward gear is selected and backward motion when a reverse gear is selected). It will also be understood that "negative" rotation is rotation in the opposite direction to "positive" rotation.

It will also be understood that there may be a degree of uncertainty in the determination of the expected engine rotation direction, especially if the expected engine speed is close to zero. Furthermore, in some implementations it may be acceptable for the starter motor to be actuated when the engine is rotating in the negative direction with a low speed (i.e. a speed close to zero rpm). The skilled person will therefore understand that the conditions for making a determination that the expected rotation is positive may be selected to ensure that there is a very low probability of a determination that the expected rotation direction is positive being made when the rotation speed after the predetermined delay will in fact be in the negative direction with a magnitude greater than a threshold value at which damage to components of the engine and/or starter motor may be expected.

The output means may be operable to send a shutdown signal to cause shutdown of the engine, the first signal may be indicative of a speed of a vehicle being below a threshold value and a braking means of the vehicle being actuated, and the processing means may be configured to cause the output means to output the shutdown signal upon receipt of the first signal. Advantageously, such a controller is operable to perform eco-stops when required in addition to providing rapid responses to change-of-mind events.

The third signal may comprise a signal from a crank sensor of the engine. The crank sensor may be arranged to produce a pulsed signal. For example, the crank sensor may be arranged to monitor a plurality of teeth of a reluctor ring having a predetermined angular spacing therebetween, the crank sensor being arranged to produce a pulse each time one of said reluctor ring teeth passes a predetermined position. The reluctor ring may be attached to the ring gear. Communicating with such a crank sensor may allow the controller to accurately determine the engine speed.

Optionally, the pulse produced when one of the reluctor ring teeth passes the predetermined position may be indicative of the direction in which the tooth passed the predetermined position. Advantageously, this allows the controller to reliably determine the current rotation direction of the engine.

The processing means may be arranged to calculate a temporal gradient in the engine rotational speed in dependence on the third signal, and the determination of the expected engine rotation direction is performed in dependence on said temporal gradient. This may allow an accurate extrapolation of the current engine speed to be performed to determine the expected rotation direction. In some examples a polynomial extrapolation may be performed.

The first signal may comprise a signal indicative of the vehicle being held stationary. Optionally, the first signal comprises a signal from a brake controller indicative of the vehicle being stationary and at least one of:
 a parking brake of the vehicle being applied; and
 a pressure applied to a brake pedal of the vehicle being greater than a predetermined value.

Advantageously, eco-stops may be performed whenever the vehicle is held stationary. The signal indicative of the vehicle being held stationary may further comprise a signal indicative of the wheel speed being substantially zero.

Optionally, the output means is operable to send a shutdown signal to cause shutdown of the engine when the vehicle is in motion. The threshold value may be approximately 20 kph.

The input means may be an input portion of the controller, for example an electrical input or an input board and the output means may be an output portion of the controller, for example an electrical output or an output board. A combined input and output means may be provided, for example in the form of an electrical input/output (I/O) interface or an I/O board. The control means may be a controller having a processor and an electronic memory.

According to another aspect of the invention for which protection is sought there is provided a stop-start system for a vehicle comprising a controller as described above and the starter motor.

The stop-start system may further comprise the engine.

According to another aspect of the invention for which protection is sought there is provided a vehicle comprising a stop-start system as described above.

According to another aspect of the invention for which protection is sought there is provided a method of controlling an engine comprising:
 initiating shutdown of the engine;
 monitoring the position of the engine and, in dependence on the engine position, determining an expected engine rotation direction after a predetermined delay; and
 receiving a signal indicative of restart of the engine being required,
wherein:
 if the expected engine rotation direction is positive when the engine restart signal is received then a starter motor is actuated upon receipt of the engine restart signal; and
 if the expected engine rotation direction is negative when the engine restart signal is received then actuating the starter motor is delayed until a determination is made that the expected rotation direction is positive.

Initiating shutdown of the engine may be performed in dependence on receipt of a first signal indicative of the vehicle speed being below a threshold value and a braking means of the vehicle being actuated.

Monitoring the engine position may comprise monitoring the output of a crank sensor of the engine. Optionally, the crank sensor is arranged to produce a pulsed signal. Further optionally, the crank sensor is arranged to monitor a plurality of reluctor ring teeth having a predetermined angular spacing therebetween, the crank sensor being arranged to produce a pulse each time one of said reluctor ring teeth passes a predetermined position. The pulse produced when one of the reluctor ring teeth passes the predetermined position may be indicative of the direction in which the tooth passed the predetermined position.

The processing means may be arranged to calculate a temporal gradient in the engine rotational speed, and the determination of the expected engine rotation direction is performed in dependence on said temporal gradient.

Optionally, the step of initiating an engine shutdown may be performed upon receipt of a signal indicative of the vehicle being held stationary. Further optionally, the signal indicative of the vehicle being held stationary may comprise a signal from a brake controller indicative of the vehicle being stationary and at least one of:
 a parking brake of the vehicle being applied; and
 a pressure applied to a brake pedal of the vehicle being greater than a predetermined value.

The signal indicative of the vehicle being held stationary may further comprise a signal indicative of the wheel speed being substantially zero.

The method may comprise initiating an engine shutdown when a vehicle in which the engine is installed is in motion. Optionally, the threshold value is approximately 20 kph.

According to a further aspect of the invention for which protection is sought there is provided a controller configured to implement a method as described above.

According to a further aspect of the invention for which protection is sought there is provided a vehicle comprising a controller as described above.

BRIEF DESCRIPTION OF THE DRAWINGS

The invention will now be described by way of example only, with reference to the accompanying figures, in which.

DETAILED DESCRIPTION

Figure 1A:
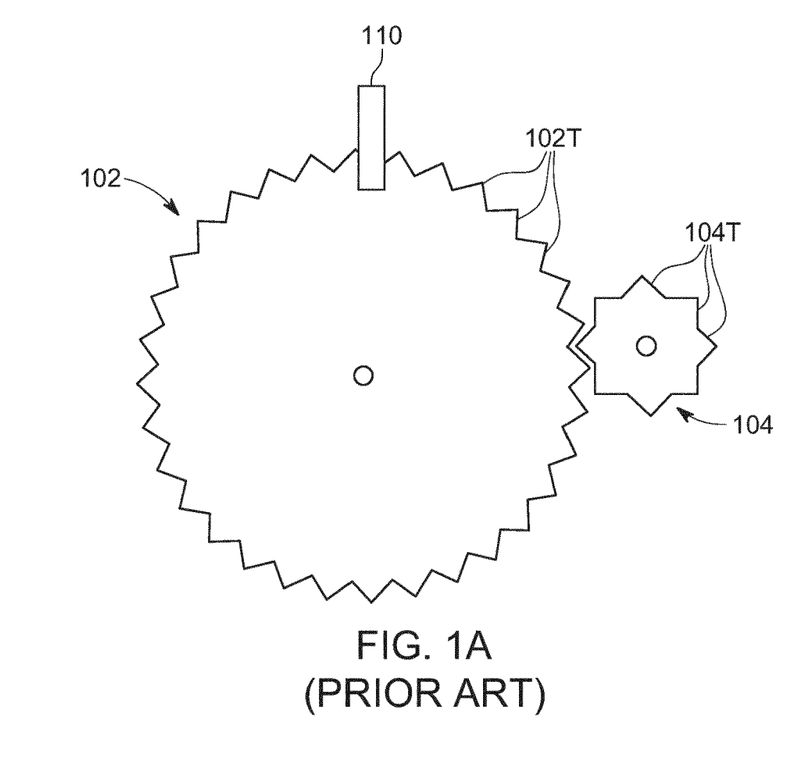
FIGS. 1A and 1B show a conventional arrangement of a starter motor and an engine crankshaft.
Figure 1B:
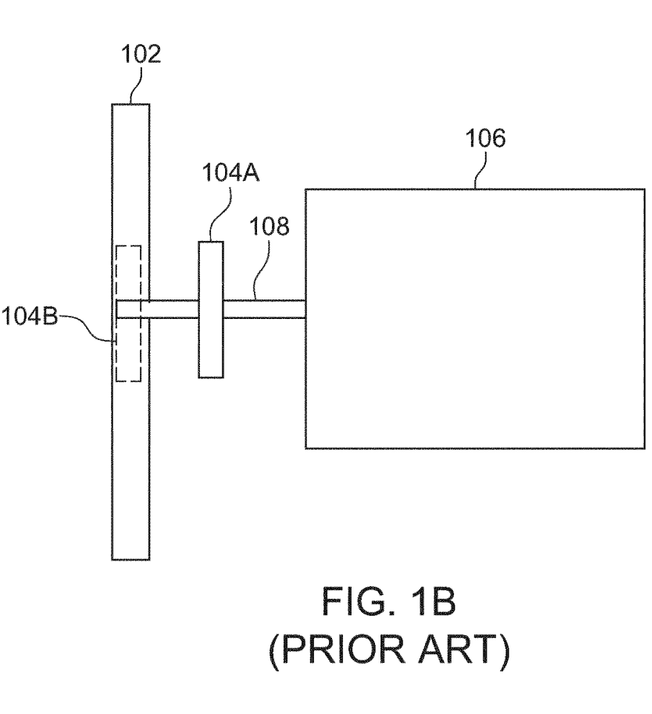

FIG. 1A shows an arrangement of a ring gear 102 of a flywheel which is connected to a crankshaft of an engine (not shown) and a starter motor pinion 104. Ring gear 102 has a plurality of teeth 102T arranged to engage corresponding teeth 104T on pinion 104. As shown in FIG. 1B, the pinion 104 is normally located at position 104A, in which the teeth 104T on the pinion do not engage with the teeth 102T on the crank.

When the engine is stopped and it is required to start it, the starter motor 106 is energised. This causes the pinion 104 to rotate and also to move from position 104A to position 104B. As will be well understood by those skilled in the art, the movement from position 104A to position 104B when the starter motor 106 is energised may be caused by a Bendix thread on shaft 108 and a return spring (not shown) may be provided to move the pinion to position 104A when the starter motor is not energised. It will be understood that other methods of moving the pinion 104 into and out of engagement with the ring gear may also be used.

When starter motor 106 is energised and the pinion 104 engages the ring gear 102 a torque that is sufficiently large to start the engine is applied to the crankshaft via the ring gear 102. Once the engine has started the pinion 104 moves out of engagement with the ring gear and the starter motor 106 is de-energised. It will be understood that the arrangement illustrated in FIGS. 1A and 1B may be utilised to start an engine either at the beginning of a journey or during a journey at the end of an eco-stop event, which may have been initiated by a stop-start system of the vehicle. However, it will be understood that initial engagement of the pinion 104 with the ring gear 102 typically only takes place when the ring gear 102 is stationary. This avoids high-speed collision between the pinion teeth 104T and the ring gear teeth 102T.

Figure 2:
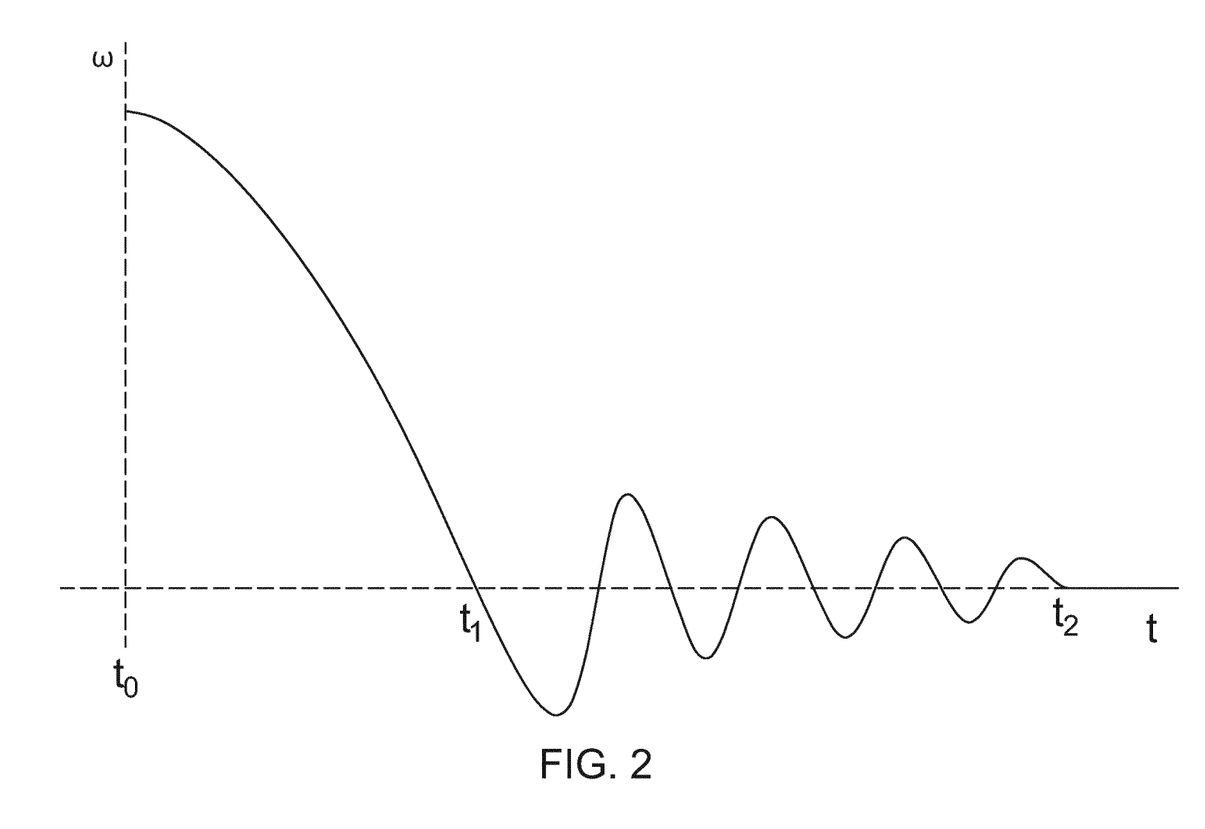
FIG. 2 shows a graph of engine speed against time in the period after engine shutdown has been initiated.

FIG. 2 shows an exemplary illustration of the variation of engine speed $\omega$ against time t after shutdown of the engine is initiated at to. After initiation of engine shutdown an engine controller may cease injecting fuel into the cylinders. However, ignition of cylinders which have already been charged with fuel may still be performed to avoid causing unburned fuel to be ejected from the exhaust of the vehicle. Ignition of the cylinders that were charged with fuel before initiation of a shutdown may be delayed compared to when the cylinders would have been ignited if the shutdown had not been requested. This reduces the amount of additional kinetic energy that is introduced into the engine as a result of the combustion of fuel that was introduced before the shutdown was initiated.

Inertia of the engine components and the combustion of fuel that was injected before a shutdown was initiated causes rotation of the engine in a positive (i.e. forward) direction to continue for a period of time after the shutdown is initiated. After both fuelling and ignition of the cylinders has been ceased the engine speed $\omega$ will reduce towards zero. However, periods of negative rotation speed will usually occur during engine shutdown as a result of the high pressure air in the cylinders as the engine comes to rest. The pressure in the cylinders causes a damped oscillation starting approximately at time which oscillation continues until the crankshaft reaches a rest position at time $t_2$.

In the event that the shutdown of the engine initiated at to was caused by a stop-start system initiating an eco-stop and an indication that the driver wishes to restart the engine is received (that is, a change-of-mind event occurs) soon after the initiation of the eco-stop but after the rotation speed of the engine has slowed sufficiently that the engine cannot be restarted by simply recommencing fuelling and ignition of the cylinders then it may be necessary in prior art vehicles to wait until $t_1$ to restart the engine. This is because, if it was attempted to re-start the engine using the starter motor 106 then a collision between the pinion teeth 104T and the ring gear teeth 102T could occur if the pinion was moved into position 104B during one of the periods of negative rotation of the engine illustrated in FIG. 2. This could result in damage to either or both of the ring gear teeth 102T and the pinion teeth 104T. The present invention allows the engine to be restarted before it has completely ceased rotation at $t_0$, without risking damage to the ring gear 102 or the pinion 104.

Figure 3:
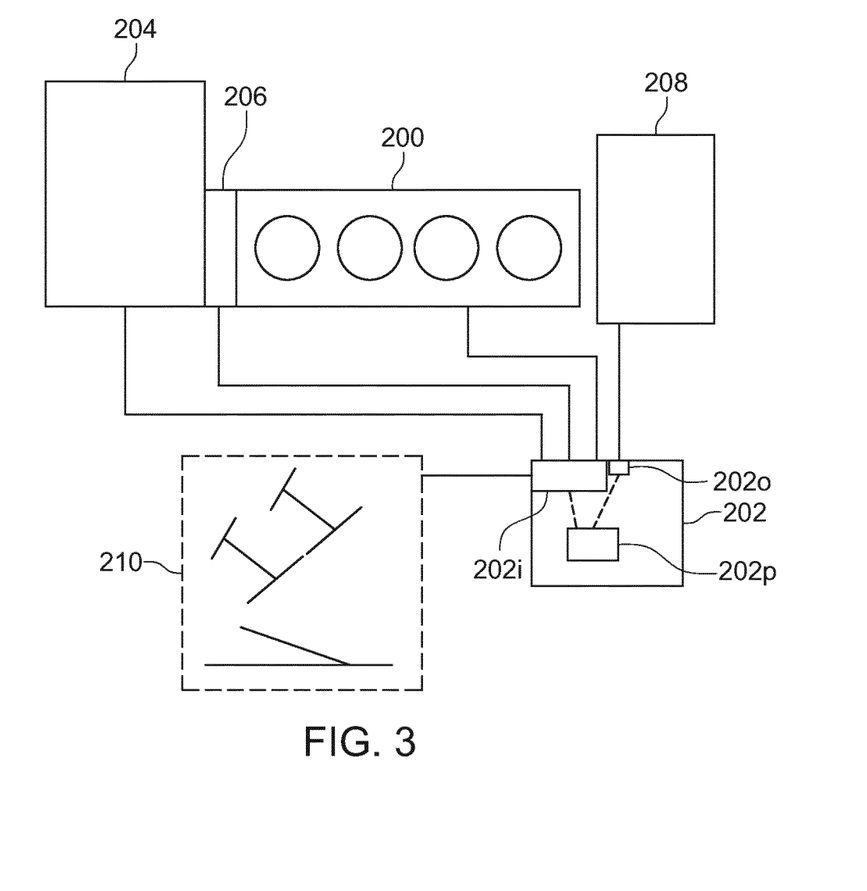
FIG. 3 shows a stop-start system.
Figure 6:
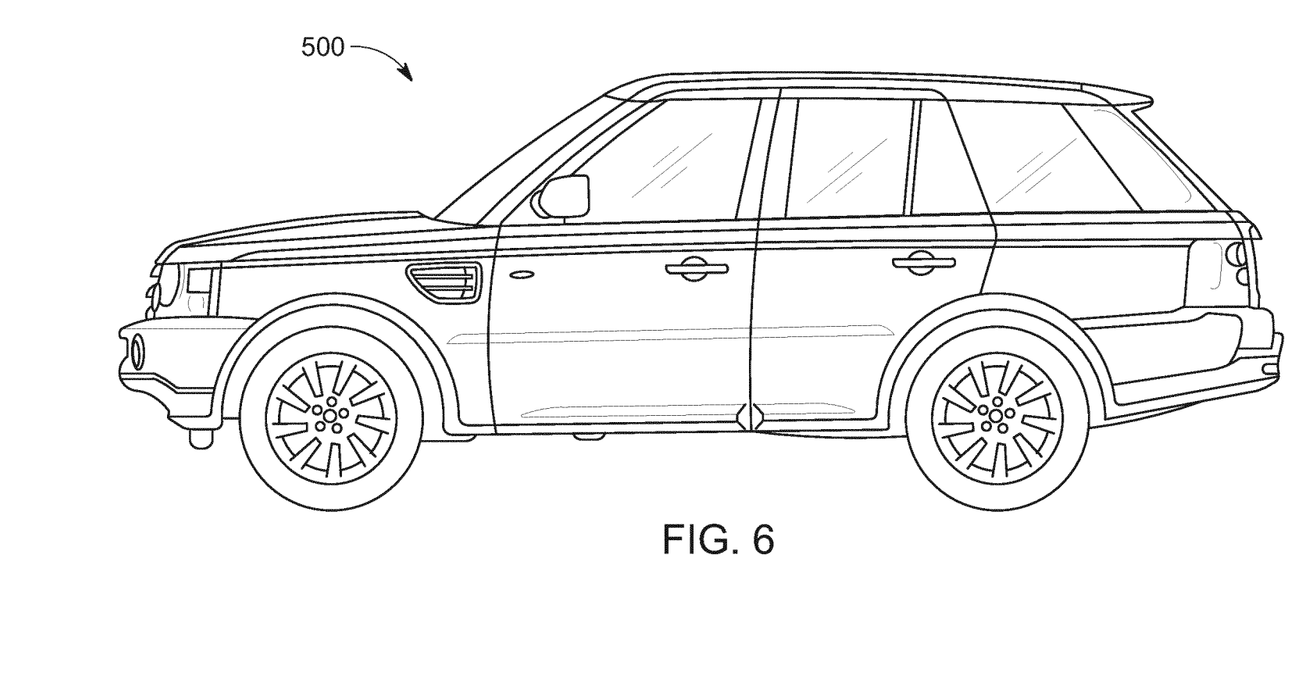
FIG. 6 shows a vehicle.

FIG. 3 shows an engine 200 that is arranged to drive the wheels of a vehicle 500 (shown in FIG. 6) via transmission 204. A clutch 206 is provided between the engine 200 and the transmission 204. Stop-start controller 202 is arranged to cause the engine 200 to perform a shutdown when it is determined that motive power from the engine is not required, and to re-start the engine when it is determined that motive power from the engine will soon be required again.

Stop-start controller 202 comprises a controller having processing means 202p in the form of an electronic processor arranged to communicate with input means 202i and output means 202o.

Input means 202i is arranged to receive inputs indicative of at least a driver input provided to driver input means 210, a rotation speed of the engine 200 and a road speed of the vehicle, which may be determined in dependence on a speed of an output shaft of the transmission 204 (as illustrated in FIG. 3). It will be understood that alternative methods of determining the road speed of the vehicle could also be used. The stop-start controller 202 is also operable to send control signals to the engine 200 and the starter motor 208 via output means 202o. It will be understood that the control signals sent to the engine 200 by the stop-start controller 202 may in fact be sent to a separate engine controller (not shown) rather than directly to the engine. Alternatively, the stop-start control may be implemented by an engine controller.

Stop-start controller 202 is arranged to determine whether or not the vehicle speed is below a threshold value (for example 5 kph) and, if the vehicle speed is below the threshold value, whether or not a driver input indicative of a desire to keep the vehicle stationary is provided. Such a driver input may comprise a handbrake being engaged or pressure exceeding a threshold value being applied to a brake pedal. If the stop-start controller 202 determines that the vehicle speed is below the threshold value that is close to 0 kph, for example 2 kph, and a driver input indicative of a desire to keep the vehicle stationary is provided then an eco-stop signal is sent to the engine 200 via output means 202o. It will be understood that in some embodiments an eco-stop may be performed when the vehicle is still moving but can be expected to come to a stop in the near future. For example, an eco-stop may be performed if the vehicle speed is less than 20 kph and the brake pressure is above a threshold value indicating a desire for the vehicle to come to a halt within a predetermined period of time. Other criteria for performing eco-stops can also be envisaged, and the present invention is applicable to stop-start systems that perform eco-stop events when any suitable criteria are met.

Upon receipt of the eco-stop signal engine shutdown is performed topped to conserve fuel. An engine start signal is subsequently provided when a driver input indicative of a desire for the vehicle to move is received. Such a driver input may comprise application of pressure exceeding a threshold value to an accelerator pedal, removal of pressure from a brake pedal or disengagement of a hand brake. In the event that the processing means 202p determines that it is necessary to restart the engine soon after an eco-stop signal has been sent then the processing means 202p is arranged to control the timing of the engine start signal to ensure that a collision between the teeth of the pinion of the starter motor 208 do not collide with the teeth of the ring gear of the engine 200. The control of the timing to prevent such collision will be described in more detail with respect to FIG. 4.

Figure 4:
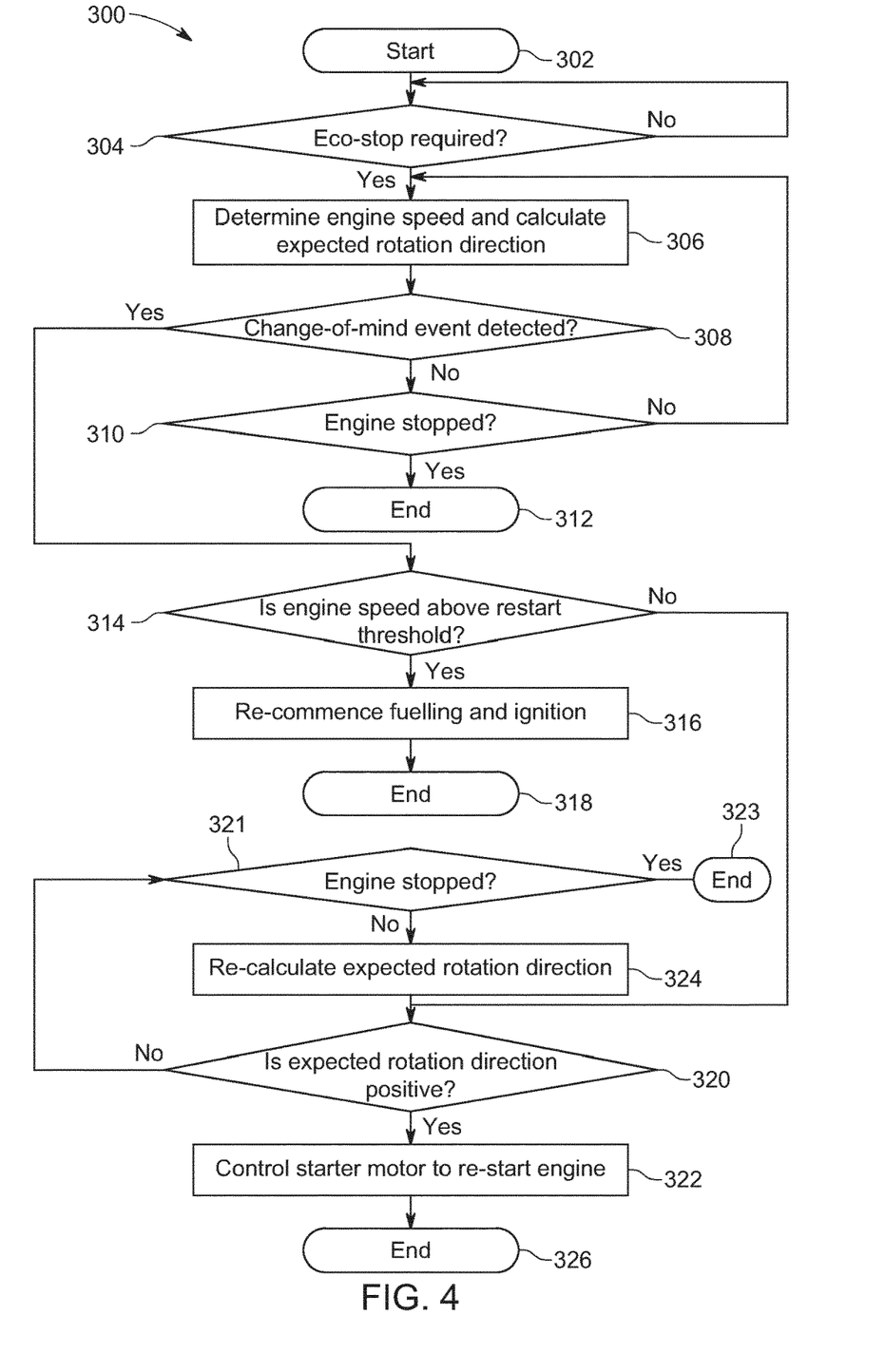
FIG. 4 shows a flow chart illustrating a method of controlling an engine.

FIG. 4 shows a method 300 which is implemented by the processing means 202p to ensure appropriate timing of the eco-stop and engine start signals. The method 300 begins at step 302 and proceeds immediately to step 304, in which it is determined whether or not an eco-stop is required, based on the criteria described above. If an eco-stop is not required then the processing means 202p repeats step 304 until inputs indicative of an eco-stop are received via the input means 202i. If an eco-stop is required then the method proceeds to step 306, in which the engine speed is determined and an expected rotation direction of the engine is calculated. An input indicative of the current engine speed is received from the engine to input means 202i. This input will provide both the magnitude and direction of the engine speed, as the engine 200 is provided with a crank sensor (not shown in FIG. 3, but similar to the crank sensor 110 shown in FIG. 1), which sensor is operable to produce a pulse each time one of the teeth of a reluctor ring (not shown) attached to the ring gear 102 passes the location of the crank sensor. As will be understood by the skilled person, the crank sensor may in fact comprise first and second sensors within a common housing, wherein the first and second sensors are arranged to detect the reluctor ring teeth passing a respective first and second positions, the first and second positions being spaced apart from each other by a distance less than the circumferential spacing between reluctor ring teeth, such that as the order in which the first and second sensors detect the passage of a given reluctor ring tooth is indicative of the direction of rotation of the reluctor ring. Accordingly, the approximate angular velocity of the engine may be determined by reference to the length of time between adjacent pulses from the same sensor, and the direction of rotation of the engine may be determined by reference to the order in which the pulses from the first and second sensors are received. In alternative examples other sensors operable to determine both the magnitude and direction of the instantaneous engine speed may be employed.

The expected rotation direction corresponds to the direction (i.e. positive or negative) in which the engine is expected to be rotating after a predetermined time delay, which time delay is approximately equal to the time delay between the processing means 202p instructing the output means 202o to output an engine start signal and the initial engagement between the pinion of the starter motor 208 and the ring gear of the engine 200. This may be equal to between 20 and 50 ms, although it will be understood that the amount of time required for the pinion of the starter motor to engage will be dependent on the type of starter motor and other factors. In the present example the time taken for the pinion of the starter motor 208 to engage the ring gear of the engine 200 is approximately 30 ms, so the expected rotation direction is the direction in which the engine is expected to be rotating 30 ms in the future. The expected rotation direction is calculated by extrapolating from data indicative of the current and recent engine speeds, and the rate of change in engine speed, to obtain an estimate of the expected engine speed after the predetermined delay. This extrapolation will be explained in more detail with reference to FIG. 5.

Figure 5:
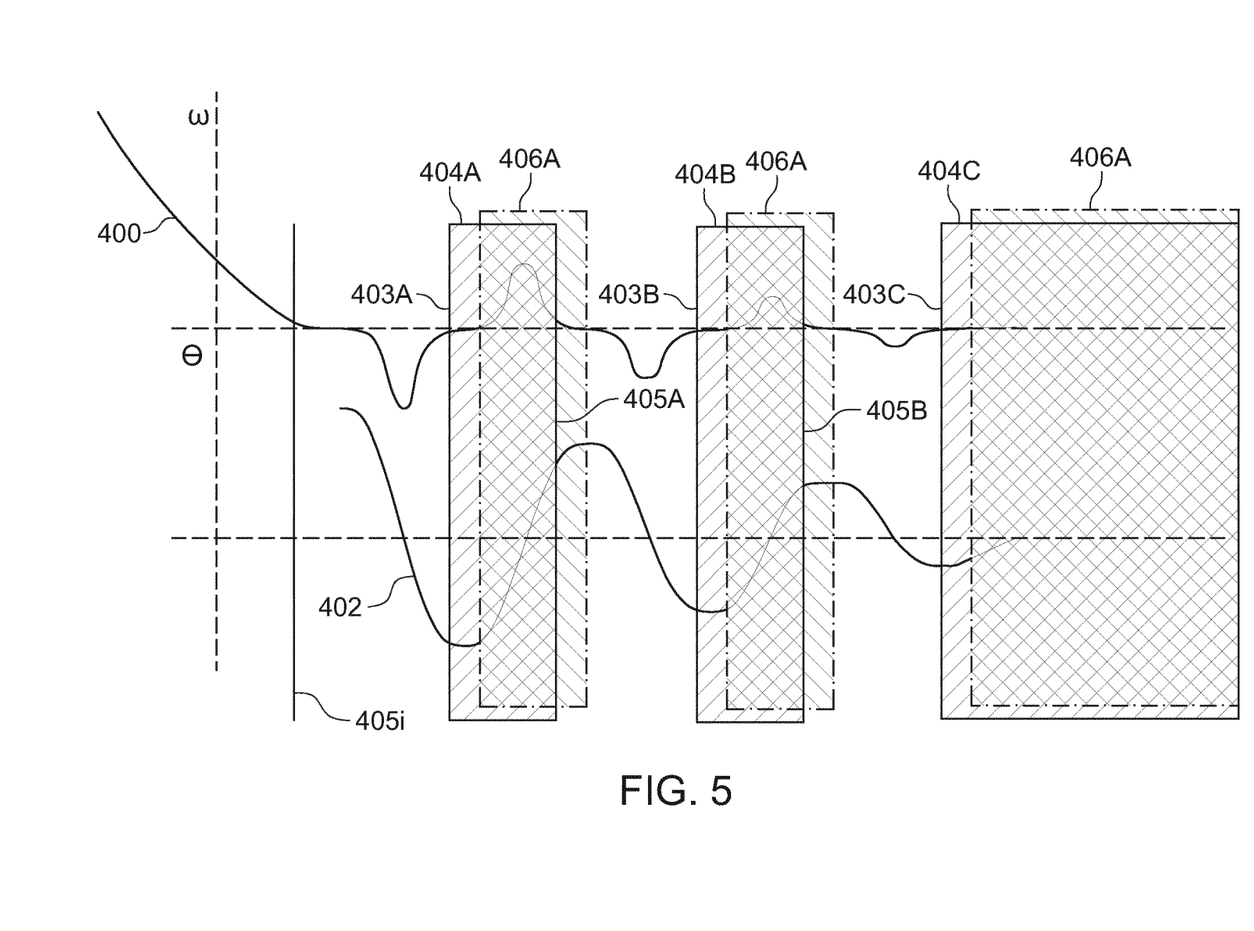
FIG. 5 shows a graph of engine speed against time with the timing of change-of-mind (CoM) opportunities indicated.

FIG. 5 shows a graph 400 illustrating the variation of engine speed ω against time t and a graph 402 showing crank position θ against time t during shutdown of the engine 200. As will be well understood by the skilled person, the engine speed ω is obtained from the time derivative of the crank position θ. Furthermore, although continuous curves are shown for both engine speed ω and crank position θ, it will be understood that the crank sensor will in fact only receive inputs indicative of the crank position θ at discrete time points corresponding to the times at which one of the teeth of the ring gear passes the position of the crank sensor. In the present example the 60 ring gear teeth are provided at six degree intervals around the circumference of the ring gear. Accordingly, 60 pulses are produced for each complete revolution of the crankshaft and ring gear 102.

Each time a pulse is received an approximate instantaneous rotation speed of the crankshaft is calculated by dividing the spacing between the teeth of the reluctor ring (1/60 of a revolution in the present example) by the time between the most recently-received pulse and the next most recently-received pulse. A rate of change of the engine speed (i.e. an acceleration or deceleration rate) may also be calculated by dividing the difference between the two most recently calculated instantaneous engine speeds by the time delay between the two calculations of instantaneous engine speed. It will be understood that a rate of change of the acceleration (or deceleration) of the engine speed could also be calculated if required, by dividing the difference between subsequent values of the acceleration rate by the time difference between the calculation of these values. In the present example the expected rotation direction corresponds to the direction in which the engine is expected to be rotating 30 ms in the future and is calculated by performing a linear extrapolation of the engine speed based on the most recently calculated instantaneous engine speed value and the next most recently calculated engine speed value to determine an expected engine speed value 30 ms in the future. The expected rotation direction is then determined to be positive if the expected engine speed is greater than a threshold value. In the present example the threshold value is 0 rpm, although in some examples a small positive value such as +50 rpm may be used as the threshold value. The use of a small positive threshold value ensures that any inaccuracies in the extrapolation do not lead to the starter motor pinion 104 engaging the ring gear at a time when the ring gear is in fact rotating in a negative direction.

It will be understood that other methods may also be used for determining the expected rotation direction. For example, in one example polynomial extrapolation of the current engine speed based on three or more previously observed engine speeds may be used to calculate an expected engine speed after the predetermined delay of 30 ms. In another example extrapolation may not be performed at all, and instead a heuristic may be used to determine whether the expected engine speed is positive or negative. A set of rules for implementing a simple example of such a heuristic are as follows:

If the most recently determined engine speed is greater than a positive threshold value, then the expected rotation direction is determined to be positive;

If the most recently determined engine speed is less than a negative threshold value, then the expected rotation direction is determined to be negative;

If the most recently determined engine speed is between the positive and negative threshold values and the most recently determined engine speed is greater than the next most recently determined engine speed, then the expected rotation direction is determined to be positive; and If the most recently determined engine speed is between the positive and negative threshold values and the most recently determined engine speed is less than the next most recently determined engine speed, then the expected rotation direction is determined to be negative.

The positive threshold may be representative of a speed that is sufficiently high that it is impossible or very unlikely for the engine to change rotation direction before the predetermined time delay has elapsed. The negative threshold value may be a value above which the engine rotation direction can be reliably expected to become positive before the predetermined delay has elapsed, provided the engine speed is accelerating not decelerating. Such a heuristic has the advantage of requiring low processing resource so that the time required to calculate the expected rotation direction is very low.

Provided the positive and negative threshold values are appropriately chosen (which choice may be based on empirical observations of the behaviour of a particular engine), the above heuristic may be very unlikely to determine a positive expected rotation direction when the rotation speed will in fact be in the negative direction with a sufficient magnitude to damage the ring gear 102 or starter motor pinion 104.

In another example the expected rotation direction may be determined by estimating the position of the start times 403A-C and the end times 405*i*, A, B of the safe regions 404A-C. A given time point may then be considered "safe" for starter motor actuation providing a start time has been identified before the time point and a corresponding end time has not yet passed. The calculation of start and end points may be continuously or periodically updated during a shutdown event.

It will be understood that any suitable method may be used for calculating the start times 403A-C and the end times 405*i*, A, B, and that different methods may be used for calculating the start and end times. For example, the position of the first end time 405*i* (i.e. the first time point following initiation of an engine shutdown after which it will be unsafe to actuate the starter motor), may be calculated in real time by performing linear or polynomial extrapolation of the engine speed vs time graph 400, determining the earliest time point at which the engine speed is expected to become negative, and subtracting an amount of time required for the starter motor pinion to engage the ring gear following a signal to actuate the starter motor. A safety margin may also be added to the amount of time required for the starter motor pinion to engage to ensure that inaccuracies in the extrapolation or the estimated amount of time needed for the starter motor pinion to engage do not result in the starter motor being actuated when it is not safe to do so. The first start point 403A (i.e. the first time point at which it is safe to actuate the starter motor after the first end point 405*i*) may be calculated by performing linear or polynomial extrapolation of the engine speed vs time graph 400, determining the earliest time point at which the engine speed is expected to become positive, and subtracting an amount of time required for the starter motor pinion to engage the ring gear following a signal to actuate the starter motor.

The position of end point 405A could be determined in a similar way to end point 405*i*. Alternatively, the end point 405A may be determined after start point 403A has passed by determining the observed time period between the rotation direction initially becoming negative (which will be soon after time point 405*i*) and the rotation direction becoming positive, adding this amount of time on to the observed time at which rotation became positive (which will be soon after time point 403A), and then subtracting the amount of time required for the starter motor pinion to engage the ring gear following a signal being sent to actuate the starter motor. Subsequent start and end points may be calculated in a similar manner.

It will be understood that the period of oscillations in a given shutdown event may be substantially constant, so once one period (or half-period) of the oscillations has been observed subsequent periods (or half-periods) of the oscillations can be assumed to be equal to a preceding period.

As shown in FIG. 5, provided the signal requesting the starter motor 208 to be energised is sent during a "safe" time period illustrated by regions 404A-C (which regions are bounded by solid lines and have light shading) then the actual engagement of the pinon of starter motor 208 with the ring gear of engine 200 will occur at a time when the engine is rotating in a positive direction, as illustrated by regions 406A-C (which regions are bounded by dashed lines and have dark shading). Accordingly, damage to the pinion of the starter motor 208 will not occur and the engine can safely be started. The determination of the expected engine speed may therefore be regarded as a determination as to whether or not it is currently safe to provide the signal to request the starter motor 208 to be energised.

It will be understood that the offset between the regions 404A-C, which illustrate times at which it is safe to send a signal to actuate the starter motor, and the corresponding regions 406A-C which illustrate the times when the engine is rotating in a forward direction, represents the delays between issuing a request for the starter motor to actuate and the pinion of the starter motor actually engaging the ring gear.

After determining the expected rotation direction in step 306 the method 300 proceeds to step 308, in which the processing means 202*p* determines whether or not a change-of-mind event has occurred in dependence on the inputs received from driver input means 210 via processor input means 202*i*. If no change-of-mind event has been detected then the method proceeds to step 310, in which the processor 202 determines whether or not the engine 200 has stopped. A determination that the engine has stopped may be made if the magnitude of the rotation speed of the engine is less than a threshold value, which may be close to zero.

If a determination that the engine has stopped is made in step 310 then the method proceeds to step 312, at which it ends. Control may then be passed to another routine which may re-start the engine in the conventional way when a user input indicative of an imminent requirement for power from the engine is received.

If a determination is made that the engine has not stopped in step 310 then the method returns to step 306, in which the expected rotation direction is recalculated. Steps 306, 308 and 310 are therefore repeated until either a change-of-mind event is detected or the engine stops.

If a change-of-mind event is detected in step 308 then the method proceeds to step 314, in which the processor 202 determines whether or not the engine speed is above a restart threshold in dependence on the rotation speed signal received from the engine via the processor input means 202*i*. The restart threshold is the speed above which it is not inevitable that the engine will stop. Accordingly, if the engine speed is above the restart speed then the method proceeds to step 316, in which fuelling of the cylinders is recommenced and cylinders that fuel has been injected into is restarted. This causes the engine 200 to restart without the need for the starter motor 208 to be energised. The method then proceeds to step 318, at which it ends.

If a determination that the engine speed is below the restart threshold is made by the processor in step 314 then the method proceeds to step 320, in which the processor checks whether or not the expected rotation direction calculated in step 306 is positive.

If the expected rotation direction is determined to be positive in step 320 then the method proceeds to step 322, in which the processor 202, via processor output means 202*o*, sends a signal requesting the starter motor 208 to be energised. This causes the pinion of the starter motor 208 to engage the ring gear of the engine 200 after a time delay substantially equal to the predetermined time delay that was used in the calculation of the expected rotation direction in step 306. Accordingly, the engine 200 may be expected to be rotating in a positive direction when the pinion of the starter motor 208 engages the ring gear of the engine 200. This avoids damage to either the pinion or the ring gear.

If the expected rotation direction is determined to be negative in step 320 then the method proceeds to step 321, in which the processor 202 determines whether or not the engine has stopped. If the engine has stopped the method ends at step 323. If a determination that the engine has not stopped is made in step 321 then the method proceeds to step 324, in which the expected rotation direction is recalculated. The recalculation of the expected rotation direction is done in the same way as the original calculation of the expected rotation direction in step 306. Steps 320, 321 and 324 are then repeated until a determination is made that the expected rotation direction is positive in step 320, or a determination is made that the engine has stopped in step 321.

A particular advantage of the method 300 is that the expected rotation direction is continuously calculated before a change-of-mind event is detected. This allows a determination as to whether or not the starter motor 208 can safely be energised to be made very quickly following detection of a change-of-mind event. This can be important, as an opportunity to energise the starter motor 208 may only be available for a short time, so a delay introduced by determining whether or not such an opportunity is available may under some circumstances lead to an opportunity that would have been available being missed. A further advantage of the present invention is that the calculation of the expected rotation direction is based on data obtained during the shutdown event, thereby allowing the estimation of the start and end points of the safe regions 404A-C to be made accurately.

It will be appreciated that the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are examples of machine-readable storage that are suitable for storing a program or programs that, when executed, implement examples of the present invention. Accordingly, examples provide a program comprising code for implementing a system or method as claimed in any preceding claim and a machine readable storage storing such a program. Still further, examples of the present invention may be conveyed electronically via any medium such as a communication signal carried over a wired or wireless connection and examples suitably encompass the same.

All of the features disclosed in this specification (including any accompanying claims, abstract and drawings), and/or all of the steps of any method or process so disclosed, may be combined in any combination that falls within the scope of the claims, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise, provided they fall within the scope of the appended claims. Thus, unless expressly stated otherwise, each feature disclosed is one example only of a generic series of equivalent or similar features.

The invention is not restricted to the details of any foregoing examples. The invention extends to any novel one, or any novel combination, of the features disclosed in this specification (including any accompanying claims, abstract and drawings), or to any novel one, or any novel combination, of the steps of any method or process so disclosed that falls within the scope of the appended claims. The claims should not be construed to cover merely the foregoing examples, but also any examples which fall within the scope of the claims.

The following numbered clauses define various further aspects and features of the present technique:

1. A controller for a starter motor and an engine, comprising:
   input means configured to receive a first signal, indicative of shutdown of the engine being required, a second signal, indicative of restart of the engine being required after initiation of shutdown of the engine, and a third signal, indicative of a position of the engine;
   output means; and
   processing means arranged to communicate with the input means and the output means,
   wherein:
   the processing means is arranged to monitor the third signal and determine an expected engine rotation direction after a predetermined delay in dependence on the third signal;
   the controller is configured to control the output means to cause the starter motor to be actuated upon receipt of the second signal if the expected engine rotation direction is positive and the second signal is received; and
   the controller is configured to delay controlling the output means to cause the starter motor to be actuated until a determination is made that the expected rotation direction is positive if the expected engine rotation direction is negative and the second signal is received.
2. A controller according to clause 1, wherein:
   the output means is operable to send a shutdown signal to cause shutdown of the engine;
   the first signal is indicative of a speed of a vehicle being below a threshold value and a braking means of the vehicle being actuated; and
   the processing means is configured to cause the output means to output the shutdown signal upon receipt of the first signal.
3. A controller according to clause 1 or clause 2, wherein the third signal comprises a signal from a crank sensor of the engine.
4. A controller according to clause 3, wherein the crank sensor is arranged to produce a pulsed signal.
5. A controller according to clause 4, wherein the crank sensor is arranged to monitor a plurality of teeth of a reluctor ring having a predetermined angular spacing therebetween, the crank sensor being arranged to produce a pulse each time one of said reluctor ring teeth passes a predetermined position.
6. A controller according to clause 5, wherein the pulse produced when one of the reluctor ring teeth passes the predetermined position is indicative of the direction in which the tooth passed the predetermined position.
7. A controller according to any preceding clause, wherein the processing means is arranged to calculate a temporal gradient in the engine rotational speed in dependence on the third signal, and the determination of the expected engine rotation direction is performed in dependence on said temporal gradient.
8. A controller according to any preceding clause, wherein the first signal comprises a signal indicative of the vehicle being held stationary.
9. A controller according to clause 8, wherein the first signal comprises an signal from a brake controller indicative of the vehicle being stationary and at least one of:
a parking brake of the vehicle being applied; and
a pressure applied to a brake pedal of the vehicle being greater than a predetermined value.
10. A controller according to clause 2, or any one of clauses 3 to 9 where dependent on clause 2, wherein the output means is operable to send a shutdown signal to cause shutdown of the engine when the vehicle is in motion.
11. A controller according to clause 10, wherein the threshold value is approximately 20 kph.
12. A stop-start system for a vehicle comprising a controller according to any preceding clause.
13. A method of controlling an engine comprising:
initiating shutdown of the engine;
monitoring the position of the engine and, in dependence on the engine position, determining an expected engine rotation direction after a predetermined delay; and
receiving a signal indicative of restart of the engine being required,
wherein:
if the expected engine rotation direction is positive when the engine restart signal is received then a starter motor is actuated upon receipt of the engine restart signal; and if the expected engine rotation direction is negative when the engine restart signal is received then actuating the starter motor is delayed until a determination is made that the expected rotation direction is positive.
14. A method according to clause 13, wherein initiating shutdown of the engine is performed in dependence on receipt of a first signal indicative of a speed of a vehicle being below a threshold value and a braking means of the vehicle being actuated.
15. A method according to clause 13 or clause 14, wherein monitoring the engine position comprises monitoring the output of a crank sensor of the engine.
16. A method according to clause 15, wherein the crank sensor is arranged to produce a pulsed signal.
17. A method according to clause 16, wherein the crank sensor is arranged to monitor a plurality of teeth of a reluctor ring having a predetermined angular spacing therebetween, the crank sensor being arranged to produce a pulse each time one of said reluctor ring teeth passes a predetermined position.
18. A method according to clause 17, wherein the pulse produced when one of the reluctor ring teeth passes the predetermined position is indicative of the direction in which the tooth passed the predetermined position.
19. A method according to any one of clauses 13 to 18, comprising calculating a temporal gradient in the engine rotational speed, and the determination of the expected engine rotation direction is performed in dependence on said temporal gradient.
20. A method according to any one of clauses 13 to 19, wherein the step of initiating an engine shutdown is performed upon receipt of a signal indicative of the vehicle being held stationary.
21. A method according to clause 20, wherein the signal indicative of the vehicle being held stationary comprises an signal from a brake controller indicative of the vehicle being stationary and at least one of:
a parking brake of the vehicle being applied; and
a pressure applied to a brake pedal of the vehicle being greater than a predetermined value.
22. A method according to any one of clauses 13 to 21, comprising initiating an engine shutdown when a vehicle in which the engine is installed is in motion.
23. A method according to clause 22 where dependent on claim 14, wherein the threshold value is approximately 20 kph.
24. A controller configured to implement a method according to any one of clauses 13 to 23.
25. A vehicle comprising a stop-start system according to clause 12 or a controller according to clause 24.

The invention claimed is:

1. A stop-start controller for a starter motor and an engine, the stop-start controller comprising:
an input configured to receive a first signal indicative of shutdown of the engine being required, a second signal indicative of restart of the engine being required after initiation of shutdown of the engine, and a third signal indicative of a position of the engine;
an output; and
a processor configured to communicate with the input and the output,
wherein:
the processor is configured to monitor the third signal and determine an expected engine rotation direction after a predetermined delay in dependence on the third signal;
the stop-start controller is configured to control the output to cause the starter motor to be actuated upon receipt of the second signal if the expected engine rotation direction is positive and the second signal is received;
the stop-start controller is configured to delay controlling the output to cause the starter motor to be actuated until a determination that the expected rotation direction is positive if the expected engine rotation direction is negative and the second signal is received;
the processor is configured to calculate a change in engine rotational speed over time in dependence on the third signal; and
the determination of the expected engine rotation direction is performed in dependence on said change in engine rotational speed over time.

2. A stop-start controller as claimed in claim 1, wherein:
the output is operable to provide a shutdown signal to cause shutdown of the engine;
the first signal is indicative of a speed of a vehicle being below a threshold value and a brake of the vehicle being actuated; and
the processor is configured to cause the output to provide the shutdown signal upon receipt of the first signal.

3. A stop-start controller as claimed in claim 2, wherein the first signal comprises a signal from a brake controller indicative of the vehicle being held stationary and at least one of:
a parking brake of the vehicle being applied; and
a pressure applied to a brake pedal of the vehicle being greater than a predetermined value.

4. A stop-start controller as claimed in claim 2, wherein the output is operable to provide a shutdown signal to cause shutdown of the engine when the vehicle is in motion.

5. A stop-start controller as claimed in claim 2, wherein the threshold value is approximately 20 kilometers per hour.

6. A stop-start system comprising the stop-start controller as claimed in claim 1.

7. A vehicle comprising the stop-start system as claimed in claim 6.

8. A method of controlling an engine of a vehicle, the method comprising:
- initiating shutdown of the engine;
- monitoring a position of the engine and, in dependence on the engine position, determining an expected engine rotation direction after a predetermined delay;
- receiving an engine restart signal indicating that restart of the engine is required;
- actuating a starter motor, wherein
  - if the expected engine rotation direction is positive when the engine restart signal is received, actuating the starter motor upon receipt of the engine restart signal, and
  - if the expected engine rotation direction is negative when the engine restart signal is received, delaying actuating the starter motor until determining that the expected rotation direction is positive; and
- calculating a change in the engine rotational speed over time in dependence on the engine position, wherein determining the expected engine rotation direction is performed in dependence on said change in the engine rotational speed over time.

9. A method as claimed in claim 8, wherein initiating shutdown of the engine is performed in dependence on receipt of a first signal indicative of a speed of the vehicle being below a threshold value and a brake of the vehicle being actuated.

10. A method as claimed in claim 9, wherein the initiating shutdown of the engine is performed upon receipt of a signal indicative of the vehicle being held stationary, wherein the signal indicative of the vehicle being held stationary comprises a signal from a brake controller indicative of the vehicle being stationary and at least one of:
- a parking brake of the vehicle being applied and
- a pressure applied to a brake pedal of the vehicle being greater than a predetermined value.

11. A method as claimed in claim 9, comprising initiating the shutdown of the engine when the vehicle is in motion.

12. A method as claimed in claim 9, comprising initiating the shutdown of the engine when the vehicle is in motion wherein the threshold value is approximately 20 kilometers per hour.

* * * * *